UNITED STATES PATENT OFFICE 2,371,890

MANUFACTURE OF HYDROCARBONS

Paul Herold and Hermann Kaufmann, Leuna, and Alfred Woerner, Mannheim, Germany; vested in the Alien Property Custodian No Drawing. Application November 14, 1940, Serial No. 365,648. In Germany February 8, 1939

7 Claims. (Cl. 196—52)

The present invention relates to a process for the manufacture of hydrocarbons from carbonaceous materials at temperatures between 200° and 700° C., and in a specific aspect the invention is concerned with improvements in cracking or in the destructive hydrogenation.

We have found that in carrying out reactions with carbonaceous materials, especially in the cracking or dehydrogenation of hydrocarbons or the destructive hydrogenation of coals, tars or mineral oils, such natural bleaching earths are particularly suitable for use as catalysts or supports for catalysts as have been soaked, impregnated or otherwise treated, prior to use, with aqueous solutions of salts of the polyvalent metals that is of the metals of the 2nd to the 8th group, and especially of the metals of the 2nd and 7th group, of the periodic table, then freed from water-soluble constituents by washing, and dried. For the preparation of the catalysts or catalyst supports, the natural bleaching earths may be used either in their natural state or in an activated state, for example after having been subjected to a pretreatment with acids. These bleaching earths are treated by soaking, impregnation or immersion for some time, for example for from 1 to 2 hours, with aqueous solutions of salts, for example chlorides, sulphates or nitrates, of the aforesaid metals, as for instance magnesium, aluminum, manganese, iron, cobalt or nickel. Thereafter the supernatant and adhering liquid is removed and the bleaching earth, which is now impregnated with the salt solution, is washed with water until the washing liquor is practically free from salts. The mass is then dried at temperatures up to about 200° C. and, if desired, further heated up to temperatures of 500° C. or more. The finished mass may be used without further treatment as a catalyst or as a support for other materials having a catalytic action which latter materials may be applied in any known or suitable manner.

The catalyst according to the present invention may be used for any reactions with carbonaceous materials yielding hydrocarbons, for example for the cracking and the dehydrogenation of hydrocarbon oils, the aromatizing or refining or destructive hydrogenation of solid and liquid carbonaceous materials, for example coals, tars, mineral oils and destructive hydrogenation products of any type, extraction products of coal, their fractions, for example benzines, middle oils or heavy oils, furthermore for the polymerization of olefines into liquid hydrocarbon oils, for the isomerization of low boiling hydrocarbons or for the production of hydrocarbon oils from mixtures of carbon monoxide and hydrogen.

The catalyst is especially well suited for use in reactions carried out at temperatures of from 200° or 300° to 700° C., under atmospheric, subatmospheric or superatmospheric pressures, for example 10 to 500 atmospheres. It may be easily revivified or regenerated after use, for example by a treatment with gases containing oxygen.

The following example serves to illustrate how the present invention may be carried out in practice, but the invention is not restricted to this example.

Example 1 kilogram of a German bleaching earth (of Deggendorf occurrence; cf. Oscar Kausch, Das Kieselsauregel und die Bleicherden, 1927, pages 174–176) having the following composition:

| | Per cent |
|---|---|
| $SiO_2$ | 62.66 |
| $Al_2O_3$ | 20.10 |
| $Fe_2O_3$ | 6.00 |
| $CaO$ | 2.01 |
| $MgO$ | 2.02 |
| $H_2O$ | 0.22 |
| Ignition loss | 7.00 |
| $Na_2O$ | |
| $K_2O$ | | is introduced into 3 liters of an aqueous solution of aluminum chloride of 20 per cent strength and allowed to remain therein for 2 hours at 20° C. The liquid is then separated from the bleaching earth, and the earth washed with water until the washing water is practically free from aluminum chloride. After drying, the mass is brought into the form of pills.

Over the catalyst so obtained, an Iranian gas oil of 0.850 specific gravity and having an aniline point of 66.2 and a boiling range of from 240° to 365° C., is passed at 460° C. with a throughput of 1 liter of oil per liter of catalyst space and per hour. The cracking product obtained contains 30 per cent of hydrocarbons boiling below 200° C. The waste resulting from gas formation is 2.5 per cent with reference to the initial material.

When preparing the catalyst with the use, instead of the said solution of aluminum chloride, of an aqueous solution of manganese sulphate of 20 per cent strength and working under otherwise identical conditions, the yield of benzine amounts to 38 per cent. The waste through the formation of gas is 1.9 per cent.

When using an aqueous solution of magnesium sulphate of 20 per cent strength and proceeding as above, the reaction product contains 45 per cent of hydrocarbons boiling up to 200° C. The gas formation amounts to 1.9 per cent.

If the salt applied is not washed out again, the activity of the catalyst is considerably lower. The yield of benzine then amounts to only about 10 per cent under otherwise identical conditions.

If the bleaching earth is not given a preliminary treatment with a solution of one of the abovesaid salts, the reaction product, obtained under otherwise identical conditions, contains only 26.5 per cent of hydrocarbons boiling below 200° C.

What we claim is:

1. A process for the manufacture of hydrocarbons by heating a carbonaceous material at a temperature between 200°-700° C., which comprises carrying out said operation in the presence of a natural bleaching earth having the composition of Deggendorf earth which has, prior to its use, been treated with an aqueous solution of a salt of a polyvalent metal for a time of the order of 1 to 2 hours, washed with water until the washing liquor is practically free from said salt and dried.

2. A process for the manufacture of hydrocarbons by heating a carbonaceous material at a temperature between 200°-700° C., which comprises carrying out said operation in the presence of a natural bleaching earth having the composition of Deggendorf earth which has, prior to its use, been treated with an aqueous solution of a salt of a polyvalent metal of about 20% concentration, washed with water until the washing liquor is practically free from said salt and dried.

3. A process for cracking a hydrocarbon oil at a temperature above 300° C., which comprises carrying out the reaction in the presence of a natural bleaching earth having the composition of Deggendorf earth which has, prior to its use, been treated with an aqueous solution of a magnesium salt of about 20% concentration for a time of the order of 1 to 2 hours, washed with water until the washing liquor is practically free from said salt and dried.

4. A process for cracking a hydrocarbon oil at a temperature above 300° C., which comprises carrying out the reaction in the presence of a natural bleaching earth having the composition of Deggendorf earth which has, prior to its use, been treated with an aqueous solution of a manganese salt of about 20% concentration for a time of the order of 1 to 2 hours, washed with water until the washing liquor is practically free from said salt and dried.

5. A process for the manufacture of hydrocarbons by heating a carbonaceous material at a temperature between 200° and 700° C., which comprises carrying out said operation in the presence of a natural bleaching earth having the composition of Deggendorf earth which has, prior to its use, been treated with an aqueous solution of a salt of a polyvalent metal, washed with water until the washing liquor is practically free from said salt and dried.

6. A process according to claim 1 in which the natural bleaching earth has been subjected to an activating treatment with acids prior to the treatment with said solution of a salt of a polyvalent metal.

7. A process according to claim 5 in which the natural bleaching earth has been subjected to an activating treatment with acids prior to the treatment with said solution of a salt of a polyvalent metal.

PAUL HEROLD.
HERMANN KAUFMANN.
ALFRED WOERNER.